United States Patent [19]

Kenney

[11] 4,274,807
[45] Jun. 23, 1981

[54] SPEED CONTROL SYSTEM FOR A WINDMILL

[76] Inventor: Clarence E. Kenney, 119 Stuart Rd., Racine, Wis. 53406

[21] Appl. No.: 929,265

[22] Filed: Jul. 31, 1978

[51] Int. Cl.$^3$ ............................................. F03D 7/04
[52] U.S. Cl. ..................................... 416/48; 416/135; 416/41
[58] Field of Search ............ 416/48, 37, 135 A, 44 A, 416/41, 139 A, 136

[56] References Cited

U.S. PATENT DOCUMENTS

| | | | |
|---|---|---|---|
| 1,401,651 | 12/1921 | Scharnagel | 416/52 |
| 2,050,142 | 8/1936 | White | 416/135 A |
| 2,067,633 | 1/1937 | Hafner | 416/136 |
| 2,360,791 | 10/1944 | Putnam | 416/37 |
| 2,655,604 | 10/1953 | Hütter | 416/136 X |
| 2,832,895 | 4/1958 | Hütter | 416/41 X |
| 3,057,410 | 10/1962 | Biermann | 416/48 |
| 3,269,121 | 8/1966 | Bening | 416/47 X |
| 3,339,639 | 9/1967 | Elmes et al. | 416/48 |
| 3,635,584 | 1/1972 | Chilman et al. | 416/48 |
| 4,029,434 | 6/1977 | Kenney | 416/225 X |
| 4,160,170 | 7/1979 | Harner et al. | 416/37 X |

FOREIGN PATENT DOCUMENTS

| | | | |
|---|---|---|---|
| 1036780 | 8/1958 | Fed. Rep. of Germany | 416/139 A |
| 1224220 | 9/1966 | Fed. Rep. of Germany | 416/48 |
| 878544 | 1/1943 | France | 416/41 |
| 983938 | 6/1951 | France | 416/140 |
| 2311196 | 12/1976 | France | 416/140 |
| 57405 | 5/1946 | Netherlands | 416/136 |
| 541206 | 11/1941 | United Kingdom | 416/136 |
| 588112 | 5/1947 | United Kingdom | 416/136 |
| 730060 | 5/1955 | United Kingdom | 416/41 |
| 772908 | 4/1957 | United Kingdom | 416/41 |

Primary Examiner—Everette A. Powell, Jr.
Attorney, Agent, or Firm—Arthur J. Hansmann

[57] ABSTRACT

A speed control system for a windmill having blades which can be feathered for altering speed and with the blades under the control of a mechanism which includes a piston assembly and a fluid governor associated therewith. Spring means are used to feather the blades against the force of the piston assembly which is interconnected with the blades, and the speed of blade rotation actually creates the fluid pressure acting on the piston assembly and a governor is associated with the piston assembly for controlling the position of the piston and thus controlling the feathering of the blades, all according to the speed of rotation of the windmill blades. The windmill can be used for generating electric power, and fail-safe mechanisms are employed for protecting in the event of a windmill blade breakage.

5 Claims, 9 Drawing Figures

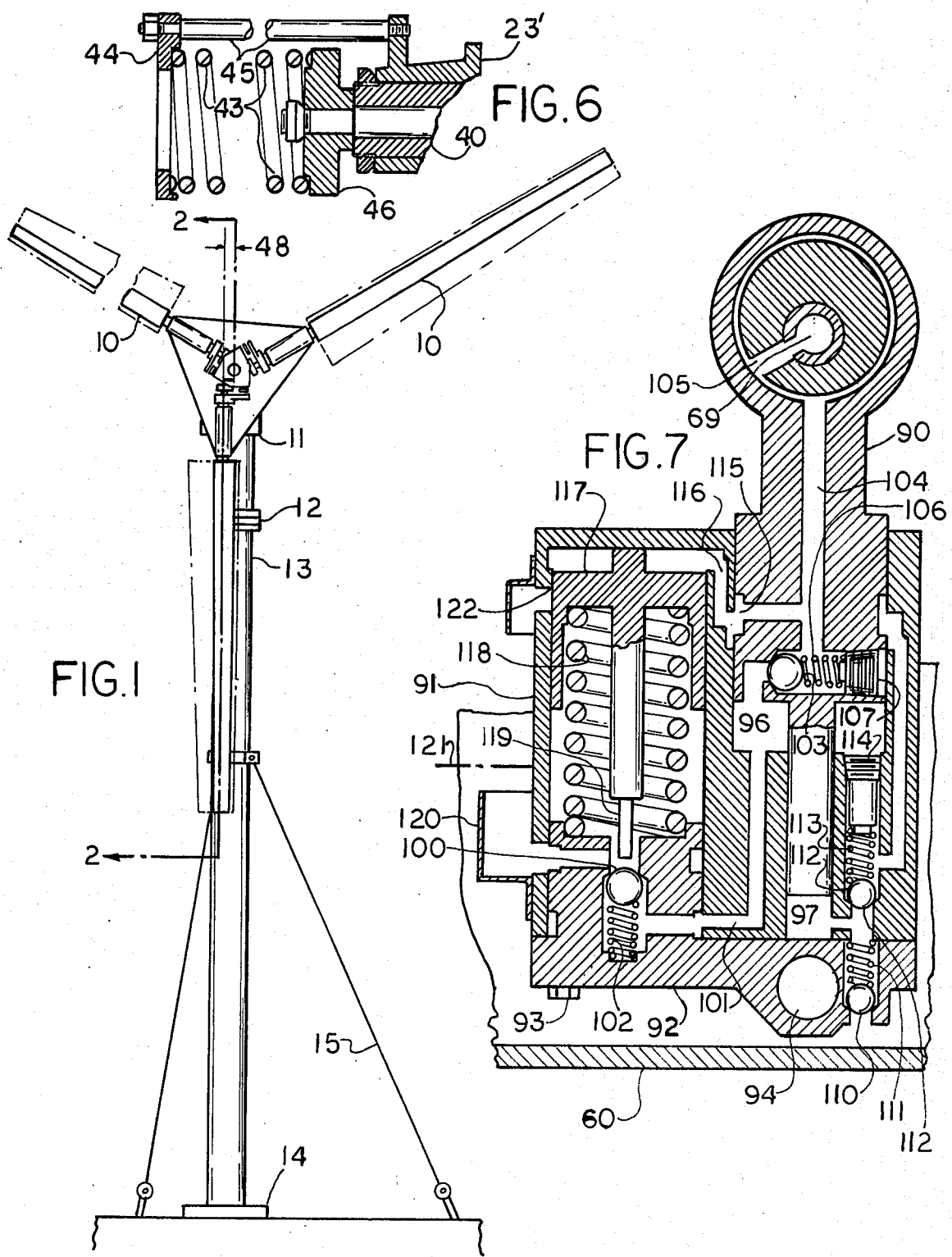

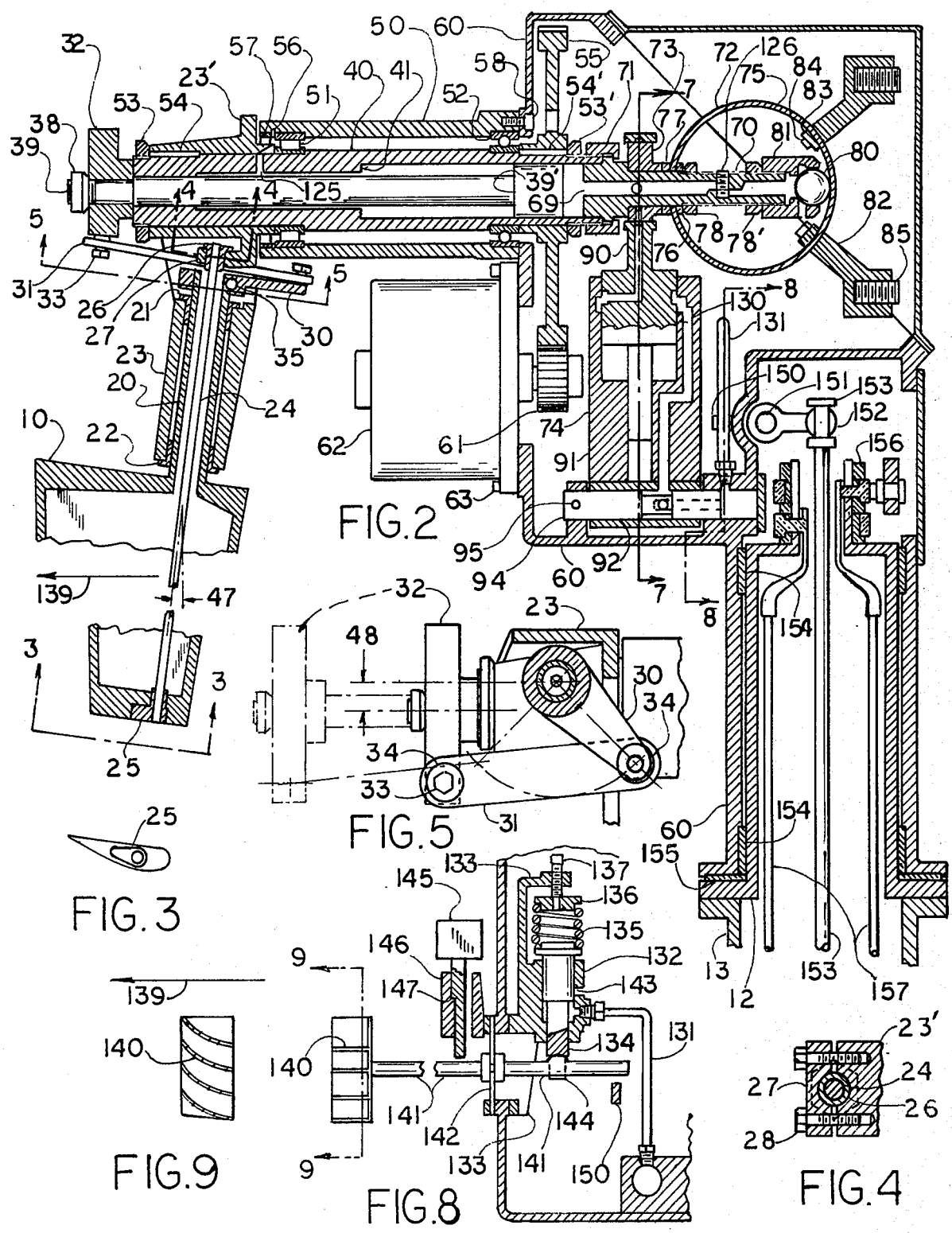

SPEED CONTROL SYSTEM FOR A WINDMILL

This invention relates to a speed control system for a windmill, and there is an improved hydraulic control system utilizing an operating piston and speed-sensitive governor integral with the main shaft of the windmill. The governor uses hydraulic fluid pressure as a feedback signal proportional to the windmill blade angle. Torsional springs within each blade combine to rotate all blades to a full feathered position upon loss of hydraulic pressure, either by intentional control or by failure of the control system, even if one of the torsion springs should break. Hydraulic fluid connections are thru-machined passages, and the entire system is enclosed in a weather-tight housing.

BACKGROUND OF THE INVENTION

As both large windmills serving communities and smaller ones privately owned become numerous, provision for safe operation will be required to gain public acceptance. Large windmills employ control mechanisms with provisions for safe operation equivalent to those of steam turbines presently supplying most of our electrical energy. Many small windmills employ less effective means, such as blades designed to stall gradually or change blade angle thru a minimum angle by direct action of a speed governor, thereby limiting rotational speed to a safe maximum in normal wind conditions. But those are incapable of reducing aerodynamic forces on the blades to near zero, by rotating them into alignment with the wind, as do the controls of large windmills.

Hydraulic control systems can rotate windmill blades to a safe full-feathered position under normal control, and, by careful design, spring force can be provided to make the control fail-safe if the hydraulic mechanism should break down. Existing hydraulic control systems employ separate mechanical elements to sense speed, supply hydraulic fluid, and to control blade angle. Mountings of these separate elements, connecting levers, and pipe connections are costly and are subject to failure. Also, an enclosure is usually required to protect them from weather.

This invention discloses a cost-effective hydraulic windmill control system, using the main windmill shaft as a cylinder for a piston to feather the blades, and using a torsion spring within each blade to provide feathering forces. The main shaft also carries a governor sensitive to shaft speed and which controls piston position by using a short travel dump valve and piston hydraulic pressure as a feedback signal proportional to piston position to control blade pitch. Fluid connection between piston, governor dump valve, and the pump are thru-passages machined in the shaft. The pump supplies fluid in quantities proportional to shaft speed, and, in the arrangement described, is driven by an eccentric on the main shaft. This pump has two separate pumping displacements, both together supplying sufficient fluid quantities to assure rotation of the blades from full-feathered position at low idling windmill speed. A suction valve having a large starting displacement is held open when the operating piston has moved thru approximately half stroke. A smaller displacement then supplies fluid for normal operation requiring minimum shaft torque to run the pump.

All elements of the control system, and gears driving a generator loading to windmill, are enclosed in an oil tight housing. A dump valve provides means of shutdown to full-feathered blade position by signals related to vibration, overspeed, manual control and others. A shutdown actuated by high wind velocity is cancelled automatically when winds diminish. The housing serves as a reservoir for hydraulic fluid, and a lower cylindrical part holds bearings which permit the windmill to rotate on a tower in response to changes in wind direction. A tight housing cover provides access for maintenance of the control system.

BRIEF DESCRIPTION OF THE DRAWINGS

FIG. 1 is a front elevational view of a windmill. Full lines show the blades in shutdown position and dot-dash lines show them in operating position.

FIG. 2 is an enlarged sectional view taken on line 2—2 of FIG. 1.

FIG. 3 is a view of one blade tip, viewed from the line 3—3 of FIG. 2.

FIG. 4 is a sectional view taken on line 4—4 of FIG. 2.

FIG. 5 is a sectional view taken on line 5—5 of FIG. 2.

FIG. 6 is a sectional view of an embodiment equivalent to part of FIG. 2 showing an alternate means of providing the spring force required to feather the blades.

FIG. 7 is an enlarged sectional view taken on line 7—7 of FIG. 2 and showing details of the pump.

FIG. 8 is a sectional view taken on line 8—8 of FIG. 2, and showing an auxiliary signal dump valve.

FIG. 9 is a sectional view taken on line 9—9 of FIG. 8, and showing the shape of vanes moved by aerodynamic force to actuate the dump valve.

DETAILED DESCRIPTION OF A PREFERRED EMBODIMENT

FIG. 1 shows a windmill having three blades 10 carried by a head assembly shown generally as 11 which pivots on a journal 12, suitably attached to the top of a tower 13. The tower is supported on a base 14 and held upright by guy wires 15. The blades 10 are shown in their full-feathered rotational positions as when the windmill is shut down. Dot-dash lines show a normal operating position of the blades. To this point, the windmill is of a conventional design.

FIG. 2 shows the root 20 of one blade 10 carried in bearings 22 and 21 which are pressed into a cylindrical projection of a hub 23. A rod 24 transmits both centrifugal force of each blade to the hub 23 and provides torsional spring force rotating it toward the feathered position shown. Rod 24 extends from an oblong fitting 25 brazed to it and held in a socket at the tip of the blade 10 as shown in FIG. 3, to a cylindrical fitting 26, also brazed to rod 24 and which is clamped in an extension 23' of the hub 23. The fitting 26 is shown in FIG. 4 clamped to the hub by a cover 27 and bolts 28.

All three blades 10 are held in the same feathered position by levers 30 and links 31 connected to a common spider 32, as shown in FIGS. 2 and 5. Bolts 33 and spherical bearings 34, pressed into the links 31, fasten the links to the spider and to the levers. Dowels 35 fasten each blade root 20 to its lever 30, so that the blades are held in a common full-feathered position when the spider 32 is contacting the end of a shaft 40, as shown in FIG. 2. The hollow shaft 40 is rotatable, and its longitudinal axis is on the axis of rotation of the blade 10. The spider is attached to the end of a combined piston and piston rod 39, carried in smooth guiding bores of the shaft 40, by a nut 38.

When assembled, each rod 24 is rotated about its longitudinal axis by means rotating fitting 26 to contribute a calculated force holding the spider 32 against the shaft 40. The sum of these forces, divided by piston area of assembly 39, is the hydraulic fluid pressure required to just move the blades 10 from the full-feathered position. Increased hydraulic pressure will move the piston 39' to contact a stop 41, machined into shaft 40. In this position, the blades will be held at low pitch in an operating position designed to recover maximum energy from all winds within a calculated normal range of velocity. This range of hydraulic control pressure will be determined by the aforementioned setting of, and the torsional spring scale of, the rods 24.

An alternate means of providing the spring force required to rotate the blades 10 to their feathered position is shown in FIG. 6, where a compression spring 43 is supported from the hub 23' by a spring seat 44 and three tension rods 45 (only one of which is shown) screwed into the hub 23'. The spring 43 pushes against a seat in a spider 46 connected to the piston rod 39, thereby, replacing the spring force of rods 24. The rods 24 can then be replaced by cables, as shown in U.S. Pat. No. 4,029,434 issued on June 14, 1977 to Kenney. The safety provisions of this previous patent are obtained with either herein described means of providing spring force. If a rod 24 should break, the blade held by it would move out only until the hub of lever 30 rested on the face of bearing 21. Increased vibration would actuate a control, described later, reducing control pressure to near zero. The remaining rods 24 would rotate all blades to their full-feathered position to shut the windmill down and with damage held to a minimum.

Provision to transmit the centrifugal force of blades 10 directly to the windmill hub 23, and geometrical mounting of blades shown by the cone angle 47 of the rotational axis of blade 10, and the displacement, designated 48 in FIG. 5, of this axis from the shaft centerline, reduce frictional forces opposing rotation of the blades so that they be rotated in either direction from a given position by minimum change in hydraulic control pressure. Low pressure change will contribute to stable control of windmill speed.

The main windmill shaft 40 is carried in a cylindrical housing 50, by bearings 51 and 52. The hub 23 and bearing 51 are held to the shaft 40 by a nut 53. A key 54 transmits torque from the hub to the shaft and a second key 54' transmits torque from the shaft to a gear 55. A second nut 53' holds the gear and bearing 52 to the shaft. Bearing 51 is held in housing 50 by a snap ring 56 and it is protected from weather by a seal 57. Bearing 52 is held between shaft housing 50 and a control housing 60 by bolts 58. The gear 55 meshes with a smaller gear 61 to drive a conventional electric generator 62 and to load the windmill. The generator is held against the housing 60 by bolts 63. Alignment of the gears is assured by both housing 50 and generator 62 respectively supporting gears 55 and 61 being bolted to a common machined face of housing 60.

An extension shaft 70 is held in accurate running alignment with the shaft 40 by a nut 71 connected therebetween. The extension 70 carries a governor, generally deisgnated 72, and an eccentric 73 on shaft 70 and which orbitally drives a pump generally designated 74. Shafts 40 and 70, with piston 39' and the governor 72, enclose a control fluid space 69. The eccentric 73 and a flexible steel prooving ring 75 are held on the shaft 70 by spacers 76 and 77 and a nut 78. A ball valve 80 is held against the prooving ring 75 by a seat member 81 which is locked in a set position by a second nut 78'. The ball 80 seats on a narrow corner of member 81 to seal hydraulic pressure in the space 69. Governor weights 82 are clamped to the prooving ring 75 by bars 83 and bolts 84 and are positioned so that increased centrifugal force of the weights will cause the ring 75 to flex and thereby move away from the ball 80 and thus reduce the force of the prooving ring holding the ball 80 onto the seat 81. Adjusting screws 85 provide means to change centrifugal force by changing their positions on the weights.

The fluid supply pump 74, consisting of a cylinder 91, a piston 90 and a regulating piston, is described with reference to FIGS. 2 and 7. The piston 90 is driven by an integral bearing ring on the piston 90 and encircling the eccentric 73 to reciprocate in the cylinder 91. A cylinder cover 92 is held to the cylinder 91 by bolts 93 and is supported by and oscillates on a shaft 94. The shaft is held in bores of bosses in housing 60 and locked by a pin 95. The two concentric diameters of the piston 90 and cylinder 91 create two separate pumping spaces, 96 and 97. The larger space 96 is filled thru a suction ball valve 100 in the cover 92, and passages 101, machined in the cylinder and cover. A light spring 102 assures closing of the valve 100. Discharge is thru ball valve 103 and passage 104 in the piston 90, and thru passages 105 in the eccentric 73 and shaft 70, both of which lead to the space 69. Spring 106 and plug 107 seat the valve 103. Suction to the pumping volume 97 is thru a ball valve 110 positioned by spring 111 and discharge is thru ball valve 112 positioned by spring 113 and a plug 114. Annular passages 115 connect both volumes to the common discharge and thru passage 116 to a space above a piston 117 in cylinder 91.

The volume of fluid pumped at low speed is sufficient to increase pressure in space 69 so that piston 39' moves to decrease the angle of blades 10. Simultaneously, piston 117 is forced down against spring 118, and, at a pressure corresponding to approximately half stroke of piston 39, a projection 119 of piston 117 will contact the ball valve 100 and hold it open, reducing energy required to drive the pump. A suction pocket 120 then open to space 96 assures fluid presence in the space 96 when the fluid has dropped below a level such as that indicated at 121 and following delivery of fluid to move piston 39'. The space 97 is sufficiently large to assure continued increase in hydraulic pressure and to move the piston 39' to the stop 41. At a small increase in pressure, the piston 117 will uncover an unpressurized port 122 preventing further increase in pressure. The windmill will operate with piston 39 against stop 41 from the lowest useful wind velocity to a rated wind velocity at which it will recover rated energy. Rotational speeds will be roughly proportional to wind velocity, depending on means provided to control generator load, but which are not part of this invention. The elements of FIG. 6, and those numbered 24 thru 38, present control mechanism for the feathering of the blade 10.

A control sensitive to rotational speed is required to protect the windmill at wind velocities and rotational speeds above rating. In an example, a windmill with blades 31 feet in diameter will deliver 8 Kw. in a 20 MPH wind at 120 RPM. The blades will be at $-4°$ pitch, the piston 39' will be against stop 41, and hydraulic control pressure will be 70 PSIG. as controlled by the piston 117. At just above 120 RMP, the weights 82 will reduce the force against the ball valve 80 to relieve fluid and drop control pressure to 60 PSIG. Further increase in rotational speed, resulting from either increased wind velocity or decreased generator load, will further increase centrifugal force of the governor weights 82, reduce control pressure, and increase blade angle. In the example, the upper limit of speed control will be at a wind velocity of 35 MPH and 135 RPM with a blade angle of −24° and 50 PSIG control pressure. When control pressure is further reduced to 20 PSIG, the blades will be at a maximum feathered position of −84°.

Stability of speed control is improved by low difference in control pressure required to move the blades thru the same position in opposite directions. This difference is termed hysteresis. Skill in the design of the piston 39' will reduce sideways force but will permit some fluid leakage. The leaking fluid will flow thru passages 125 in the shaft and hub to lubricate bearings 51 and 52 and return to the housing 60 in the form of a screw plug, a valve 126, can be adjusted to limit flow of fluid from space 69 to valve body 81 and so limit the rate at which blades 10 can be feathered. Means shown in U.S. Pat. No. 4,029,434 to reduce frictional load of bearings 21 and 22 supporting the blades 10 and described in detail in this application will reduce hysteresis and contribute to stability of speed control.

The designed range of speed control is established by mechanical ability of the windmill to resist centrifugal forces and by the means loading the windmill and applications of the energy recovered by it.

A control fluid dump valve responsive primarily to wind velocity is shown in FIGS. 8 and 9. A passage 130 in pump 74, as seen in FIG. 2, conducts control fluid thru the shaft 94 and a pipe 131, fluid-flow connected therewith, to a dump valve shown generally as 132 in FIG. 8. Control fluid is connected to an annulus between body 133 and piston 134 to move the piston upward against a spring 135, a seat 136, adjusting screw 137 and a projection of the body 133. A cascade of vanes 140, carried on a lever 141 which pivots on and is sealed against weather by a diaphragm 142, responds to increase wind velocity by adding to the upward force of piston 134. At a velocity just above that, driving the windmill to maximum governed speed, the piston will move up to uncover a port 143 and dump control fluid. The action is accumulative as control system pressure decreases so that spring force will not move the piston down to cover the port 143 until wind velocity has decreased to a low value determined by the designed piston areas, spring scale and the vanes 140. Sideways movement of the lever 141 is restrained by projections 144 which are part of the piston 134.

Only two of many possible auxiliary signals will be described. A weight 145 is guided vertically in a bracket 146 and rests on a sear face 147. Vibration in excess of normal will move the weight on the sear surface so that it will drop to push down on the outer end of lever 141 and dump control fluid. The mechanism is deliberately designed so that an operator must manually replace the weight on the sear surface to start the windmill. A lever 150, shown also in FIG. 2, is carried on a shaft 151 which is part of a lever 152. A manual control rod 153 extends down to near ground level. When it is pulled down, the lever 150 is lifted to contact lever 140 and dump control fluid. Continued downward movement of this control can apply a conventional brake, not shown, to lock the feathered blades in any required rotational position.

The lower cylindrical part of the control housing 60 is bored to receive two bearings 154 which pivot on the extension 12 of the tower 13 permitting the head assembly 11 to swing downwind. Wind direction with respect to blades 10 is shown in FIGS. 2 and 9 by arrows 139. Weight of the head assembly is carried on a thrust bearing 155. The upper end of tower extension 12 carries insulated collecting rings of a brush and ring assembly shown generally as 156. Electrical power leads 157 transmit power generated.

What is claimed is:

1. A windmill control system comprising a plurality of rotatably mounted windmill blades having a common axis of rotation, said blades being pivotal about the respective longitudinal axis of each of said blades to alter the pitch of said blades, a rotatably mounted hollow shaft disposed on the rotational axis of said blades and being rotatable with said blades, a piston assembly movably disposed within said hollow shaft and movable in response to fluid pressure in said shaft for decreasing the pitch of said blades, a fluid pressure generating mechanism in driven relation with said shaft and generating fluid pressure on said piston assembly in response to the rotation of said blades, a fluid pressure governor operatively connected with said generating mechanism for decreasing the fluid pressure on said piston assembly according to the speed of rotation of said blades, control mechanism interconnected between said piston assembly and said blades for adjusting the pitch of said blades in response to the movement of said piston assembly, and an elastic member disposed within each of said blades and connected thereto and being operatively connected with said control mechanism and being disposed and operative to transmit the centrifugal force of said blades to said shaft and to counter the force of fluid pressure on said piston assembly and thereby increase the pitch of said blades when fluid pressure on said piston assembly is decreased.

2. The windmill control system as claimed in claim 1, wherein said governor includes a fluid flow control valve operative on the hollow of said shaft and with said governor tending to hold said valve closed against fluid pressure and including rotatable centrifugal-force active weights disposed to tend to open said valve and establish stable control of the rotational speed of said shaft by adjusting the pitch of said blades.

3. The windmill control system as claimed in claim 1 or 2, wherein said fluid pressure generating mechanism is pump means having two or more separate pumping displacements each delivering fluid in quantity proportional to rotational speed of said shaft, one displacement being sufficient to deliver fluid required for control of said shaft rotational speed using minimum pumping energy and the other displacement being sufficient to assure initial control of pitch angle of said blades at low rotational speed of said shaft, and means controlling said pump means to stop pumping at a fluid pressure below that at which said governor operates to control rotational speed of said shaft.

4. The windmill control system as claimed in claim 2 or 3, including a second valve fluid-flow connected with said shaft to drain fluid from said hollow shaft in response to winds of a specified high velocity, whereupon said elastic member will adjust the pitch of said blades to reduce rotational speed of said shaft to an idling speed in winds of the specified velocity, said second valve being arranged and connected in the system to be responsive to pressure of said fluid so that second valve will close automatically at a specified low wind velocity.

5. The windmill control system as claimed in claim 1, including a stop in said shaft for limiting the movement of said piston assembly in the direction of decreasing the pitch of said blades.

* * * * *